(12) United States Patent
Yamaguchi

(10) Patent No.: US 6,519,092 B2
(45) Date of Patent: Feb. 11, 2003

(54) IMMERSION MICROSCOPE OBJECTIVE LENS

(75) Inventor: Kotaro Yamaguchi, Kumagaya (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/986,954

(22) Filed: Nov. 13, 2001

(65) Prior Publication Data

US 2002/0089760 A1 Jul. 11, 2002

(30) Foreign Application Priority Data

Nov. 14, 2000 (JP) ........................................ 2000-347095

(51) Int. Cl.⁷ .............................................. G02B 21/02
(52) U.S. Cl. ........................ 359/656; 359/661; 359/791
(58) Field of Search ................................ 359/656–661, 359/791, 754

(56) References Cited

U.S. PATENT DOCUMENTS 3,598,474 A * 8/1971 Shoemaker ................. 359/659
3,700,311 A * 10/1972 Shoemaker ................. 359/656
5,532,878 A 7/1996 Suenaga et al. ............. 359/657
5,798,869 A * 8/1998 Watanabe .................... 359/656
5,982,559 A * 11/1999 Furutake ..................... 359/656

FOREIGN PATENT DOCUMENTS

JP         9-258107 A   * 10/1997
JP         2000-035541     2/2000

* cited by examiner

Primary Examiner—Evelyn A Lester

(57) ABSTRACT

An immersion microscope objective lens comprises a first lens group G1 having a positive refracting power, a second lens group G2 having a positive refracting power and a third lens group G3 having a negative refracting power in the order from the object side. The first lens group G1 has a first cemented lens consisting of a plano-convex lens with the flat surface facing the object side and a meniscus lens with the convex lens facing the image side cemented together, a positive lens with the surface having a greater refractive power facing the image side, and a second cemented lens consisting of a negative lens and a positive lens cemented together, in the order from the object side. The second lens group G2 has a cemented lens consisting of a negative lens and a positive lens cemented together. The refractive index $n_{12}$ of the meniscus lens in the first lens group G1 with respect to the d-line satisfies the following condition:

$n_{12} > 1.9$.

10 Claims, 7 Drawing Sheets

IMMERSION MICROSCOPE OBJECTIVE LENS

This application claims the benefit of Japanese Patent application No. 2000-347095 which is hereby incorporated by reference.

BACKGROUND OF THE INVENTION

1. Field of the Invention

The present invention relates to an immersion microscope objective lens, and particularly, to an objective lens which is suitable for an immersion microscope for observing an optical path between the objective lens and an object to be observed in a state that the optical path is filled with liquid such as water or oil.

2. Related Background Art

In an immersion microscope objective lens of high magnification, a plano-convex lens having a relatively low refractive index is embedded in a lens at the tip end in order to correct a curvature of field and a negative refracting power is given to a cemented surface by means of a difference of refractive index between the two lenses, thereby reducing a Petzval sum. Further, a pair of concave surfaces facing each other are disposed at positions with a small diameter of light flux. The Petzval sum is decreased by the strong refracting power of these concave surfaces.

That is, an arrangement which combines the reduction of a Petzval sum by using an embedded lens with that by using a so-called Gauss type lens is known as a publicly known art. An apochromat type objective lens of high magnification which serves as such an immersion microscope objective lens is disclosed in, for example, the Japanese Patent Application Laid-Open No. 2000-35541.

Generally, when a Petzval sum is to be reduced by an embedded plano-convex lens at the tip end, it is advantageous that a meniscus lens into which the plano-convex lens is embedded should have as great thickness as possible and should be formed of an optical material having a higher refractive index. In this case, however, the spherical aberration of a color developed on a convex surface with a strong curvature facing the image side of the meniscus lens in which the plano-convex lens is embedded is increased.

The above phenomenon is caused by the fact that a dispersion (a difference of refractive index by a wavelength) tends to be relatively great when the refractive index of an optical material is high, and the fact that, when the meniscus lens is made thick, the height h of a light flux on the refractive surface on the air side thereof becomes great. Also in the conventional immersion microscope objective lens disclosed in the above patent application, aberrations are not sufficiently corrected and, particularly, a high-order component of a spherical aberration (a different of spherical aberration by a wavelength) of a color remains.

SUMMARY OF THE INVENTION

The present invention has been contrived taking the above problems into consideration, and an object thereof is to provide an immersion microscope objective lens which has a high magnification and a high numerical aperture, with excellently corrected aberrations over the wide field of view, and has excellent imaging performance.

In order to solve the above problems, according to the present invention, there is provided an immersion microscope objective lens comprising a first lens group G1 having a positive refracting power, a second lens group G2 having a positive refracting power and a third lens group G3 having a negative refracting power in the order from the object side, characterized in that:

the first lens group G1 has a first cemented lens comprising a plano-convex lens with the flat surface facing the object side and a meniscus lens with the convex surface facing the image side cemented together, a positive lens with the surface having a larger refractive index facing the image side, and a second cemented lens comprising a negative lens and a positive lens cemented together;

the second lens group G2 has a cemented lens comprising a negative lens and a positive lens cemented together; and the refractive index n12 of the meniscus lens in the first lens group G1 with respect to the d-line satisfies the following condition:

$$n12 > 1.9.$$

According to a preferred embodiment of the present invention, the following condition is satisfied:

$$5 < |f31|/F < 25,$$

where the focal length of the negative lens for constituting the second cemented lens in the first lens group G1 is f31, and the focal length of the entire objective lens system is F.

Also according to a preferred embodiment of the present invention, the second lens group G2 has a third cemented lens composed of a negative lens and a positive lens cemented together, a fourth cemented lens comprising a negative lens and a positive lens cemented together, and a fifth cemented lens comprising a negative meniscus lens, a biconvex lens, and a biconcave lens cemented together, in the order from the object side.

Further, according to a preferred embodiment of the present invention, the third lens group G3 has a sixth cemented lens comprising a positive lens with the convex surface facing the object side and a negative lens with the concave surface facing the image side cemented together, and a seventh cemented lens comprising a negative lens with the concave surface facing the object side and a positive lens with the convex surface facing the image side cemented together, in the order from the object side; and the following conditions are satisfied:

$$n71 > 1.49; \text{ and}$$

$$n82 > 1.6,$$

where the refractive index of the positive lens in the sixth cemented lens with respect to the d-line is n71 and the refractive index of the positive lens in the seventh cemented lens with respect to the d-line is n82.

Also, according to a preferred embodiment of the present invention, the refractive index n11 of the plano-convex lens in the first lens group G1 with respect to the d-line satisfies the following condition:

$$n11 > 1.55.$$

In an immersion microscope objective lens according to a representative embodiment of the present invention, the first lens group G1 consists of three lens components. The first lens component is a so-called embedded lens component, which is the first cemented lens comprising a plano-convex lens with the flat surface facing the object side, and a meniscus lens in which this plano-convex lens is embedded cemented together.

In this case, due to an arrangement that the plano-convex lens has substantially the same refractive index as that of the used liquid (immersion liquid), little spherical aberration is generated advantageously on an interface between the liquid and the plano-convex lens. Further, since a strong negative refracting power is applied onto a cemented surface with the meniscus lens in which the plano-convex lens is embedded, a Petzval sum is reduced.

A light flux having passing through the first lens component is given a moderate refractive action by the second lens component which is a single lens having a positive refracting power. On this occasion, an angle of deviation of a marginal light beam is arranged to be as small as possible due to the arrangement that the positive lens for constituting the second lens component has the surface having a greater refracting power facing the image side.

The third lens component is adapted to correct a longitudinal chromatic aberration and a spherical aberration of a color generated on the convex surface having a strong curvature on the image side in the first and second lens components by the use of the second cemented lens which is constituted by the negative lens and the positive lens having approximately the same refractive indexes and different dispersions cemented together.

On the other hand, in the second lens group G2, a light emitted from the first lens group G1 is converted to a convergent light and a cemented lens consisting of a negative lens and a positive lens cemented together is disposed, thereby correcting a spherical aberration and a longitudinal chromatic aberration. In this case, it is the most preferable in terms of the aberration correction mentioned above to form the second lens group G2 of the two sets of cemented lenses consisting of negative lenses and positive lenses cemented together, that is, the third cemented lens and the fourth cemented lens, and the fifth cemented lens which consists of the negative meniscus lens, the biconvex lens and the biconcave lens.

In the third lens group G3, a longitudinal chromatic aberration and a lateral chromatic aberration are corrected in an well-balanced manner while a Petzval sum is reduced. In this case, when the lens group is arranged in a so-called Gauss type structure, a more excellent correction effect of the Petzval sum, and a more excellent correction effect of a curvature of the field can be expected in its turn.

The conditions of the present invention will be fully described below. According to the present invention, the refractive index n12 of the meniscus lens for constituting the first cemented lens in the first lens group G1, that is, the meniscus lens in which the plano-convex lens is embedded, with respect to the d-line satisfies the following condition (1):

$$N12>1.9 \tag{1}$$

The condition (1) defines an appropriate range for the refractive index n12 of the meniscus lens in which the plano-convex lens is embedded. Below the lower limit of the condition (1), a sufficient negative refracting power can not be obtained on the cemented surface between the plano-convex lens and the meniscus lens. As a result, the Petzval sum can not be sufficiently reduced, thereby deteriorating the flatness of the image surface. In order to secure a more excellent imaging performance while satisfactorily correcting the curvature of field up to the visual field No. 25, it is desirable to set the lower limit for the condition (1) at 2.0.

Also, according to the present invention, it is preferable to satisfy the following condition (2):

$$5<|f31|/F<25 \tag{2}$$

where f31 is the focal length of the negative lens for constituting the second cemented lens in the first lens group G1, and F is the focal length of the entire objective lens system.

The condition (2) defines a condition for satisfactorily correcting a longitudinal chromatic aberration and a spherical aberration of color. Beyond the range for the condition (2), it becomes undesirably difficult to correct not only the chromatic aberration, but also the spherical aberration. Note that it is preferable to set the upper limit for the condition (2) at 21 and the lower limit at 7, in order to secure a more excellent imaging performance while maintaining the numerical aperture NA of 1.4 or more.

Also, according to the present invention, it is preferable that third lens group G3 should have the sixth cemented lens which comprises the positive lens with the convex surface facing the object side and the negative lens with the concave surface facing the image side cemented together, in the order from the object side, and the seventh cemented lens which comprises the negative lens with the concave surface facing the object side and the positive lens with the convex surface facing the image side cemented together, in the order from the object side, and should satisfy the following conditions (3) and (4):

$$n71>1.49 \tag{3; and}$$

$$n82>1.6 \tag{4}$$

where n71 is the refractive index of the positive lens in the sixth cemented lens group with respect to the d-line, and n82 is the refractive index of the positive lens in the seventh cemented lens with respect to the d-line.

The condition (3) defines an appropriate range for the refractive index n71 of the positive lens in the sixth cemented lens in the third lens group G3 which is arranged of the Gauss type. Beyond the range for the condition (3), the radius of curvature of the surface on the air side (surface on the object side) of the positive lens in the sixth cemented lens becomes too small to sufficiently reduce the Petzval sum, which will undesirably deteriorate a coma. Note that, in order to further secure an excellent imaging performance while satisfactorily correcting the curvature of field, it is desirable to set the lower limit for the condition (3) at 1.56.

The condition (4) defines an appropriate range for the refractive index n82 of the positive lens in the seventh cemented lens in the third lens group G3 arranged to be of the Gauss type. Beyond the range for the condition (4), the radius of curvature of the surface on the air side (surface on the image side) of the positive lens in the seventh cemented lens becomes too small to sufficiently reduce the Petzval sum, which will undesirably deteriorate a coma. Note that, in order to further secure an excellent imaging performance while satisfactorily correcting the curvature of field, it is desirable to set the lower limit for the condition (4) at 1.80.

Also, according to the present invention, when the numerical aperture of the objective lens exceeds 1.4, it is preferable that the refractive index n11 of the plano-convex lens in the first lens group G1 with respect to the d-line satisfies the following condition (5):

$$n11>1.55 \tag{5}$$

When liquid having a comparatively high refractive index such as oil having a refractive index of 1.55 or higher is used to secure a high numerical aperture, it is possible to satisfactorily suppress a spherical aberration which may be generated on an interface between the liquid and the plano-convex lens.

DETAILED DESCRIPTION OF THE PREFERRED EMBODIMENTS

Preferred embodiments of the present invention will be described with reference to the attached drawings.

In each of the embodiments, an immersion microscope objective lens of the present invention is composed of a first lens group G1 having a positive refracting power, a second lens group G2 having a positive refracting power and a third lens group G3 having a negative refracting power, in the order from the object side. The microscope objective lens in each embodiment is of the oil immersion type using oil as the immersion liquid. Therefore, when the microscope objective lens of each embodiment is used for observation, a cover glass is disposed to be in contact with an object to be observed, and immersion oil is filled in an optical path between the cover glass and the objective lens.

In each of the embodiments, since the microscope objective lens is designed to be infinite, an imaging lens (second objective lens) is disposed on the image side of the microscope objective lens with a predetermined spatial distance therebetween, and the microscope objective lens and the imaging lens are combined with each other so as to form a finite optical system. Note that the views of aberrations in the following embodiments show aberrations when the longitudinal or axial spatial distance between the microscope objective lens and the imaging lens is 150 mm. However, the present inventors have confirmed that, even if the longitudinal spatial distance varies within a range from 50 mm to 180 mm, little fluctuation occurs in the aberrations.

Figure 7:
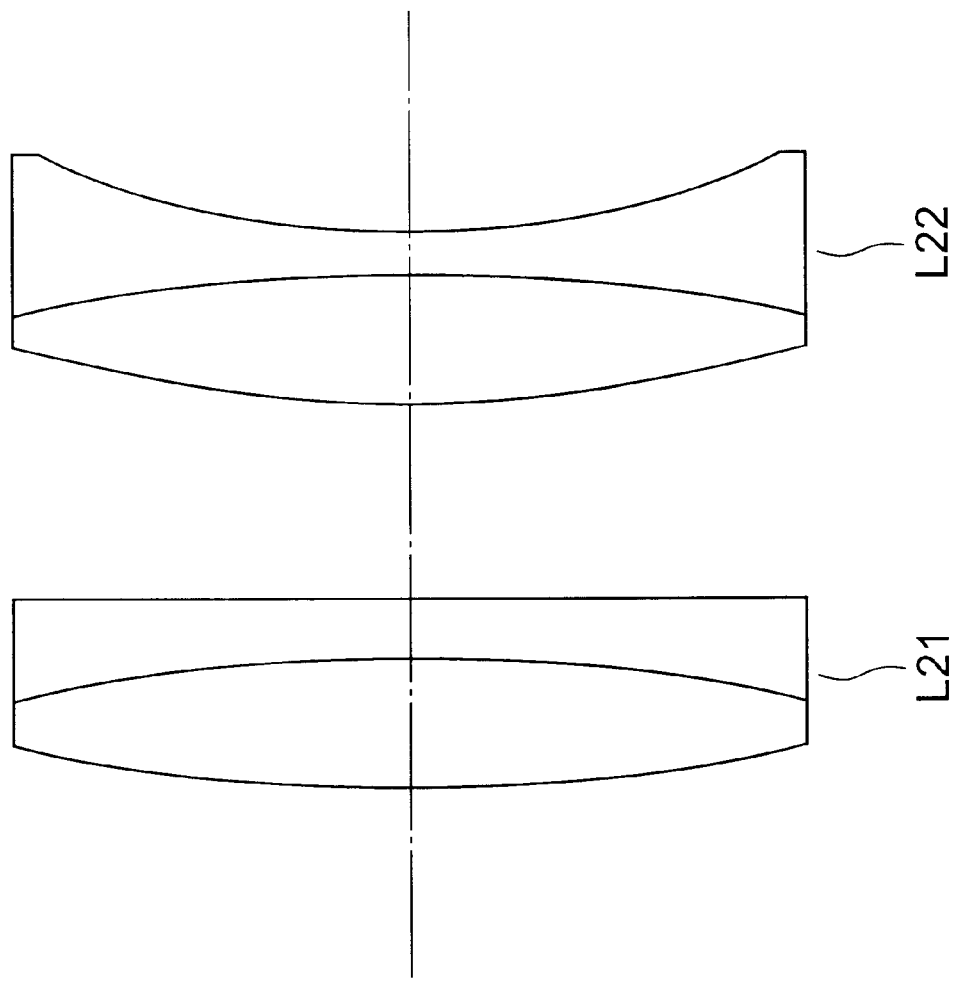
FIG. 7 is a view for showing the structure of an imaging lens according to each of the embodiments.

FIG. 7 is a view for showing the structure of an imaging lens system in each embodiment. As shown in FIG. 7, the imaging lens system is composed of a cemented lens L21 consisting of a biconvex lens and a biconcave lens cemented together and a cemented lens L22 consisting of a biconvex lens and a biconcave lens cemented together, in the order from the object side. The following Table (1) shows specifications of the imaging lens system in each embodiment. In Table (1), the surface number indicates the order of each lens surface from the object side, r the radius of curvature (mm) of each lens surface, d the distance (mm) between the lens surfaces, n the refractive index with respect to the d-line ($\lambda$=587.6 nm), and vd an Abbe's number with respect to the d-line, respectively.

TABLE 1

| Surface number | r | d | n | vd |
|---|---|---|---|---|
| 1 | 75.040 | 5.1 | 1.62280 | 57.03 (L21) |
| 2 | −75.040 | 2.0 | 1.74950 | 35.19 |
| 3 | 1600.580 | 7.5 | | |
| 4 | 50.260 | 5.1 | 1.66755 | 41.96 (L22) |
| 5 | −84.540 | 1.8 | 1.61266 | 44.41 |
| 6 | 36.910 | | | |

[First Embodiment]

Figure 1:
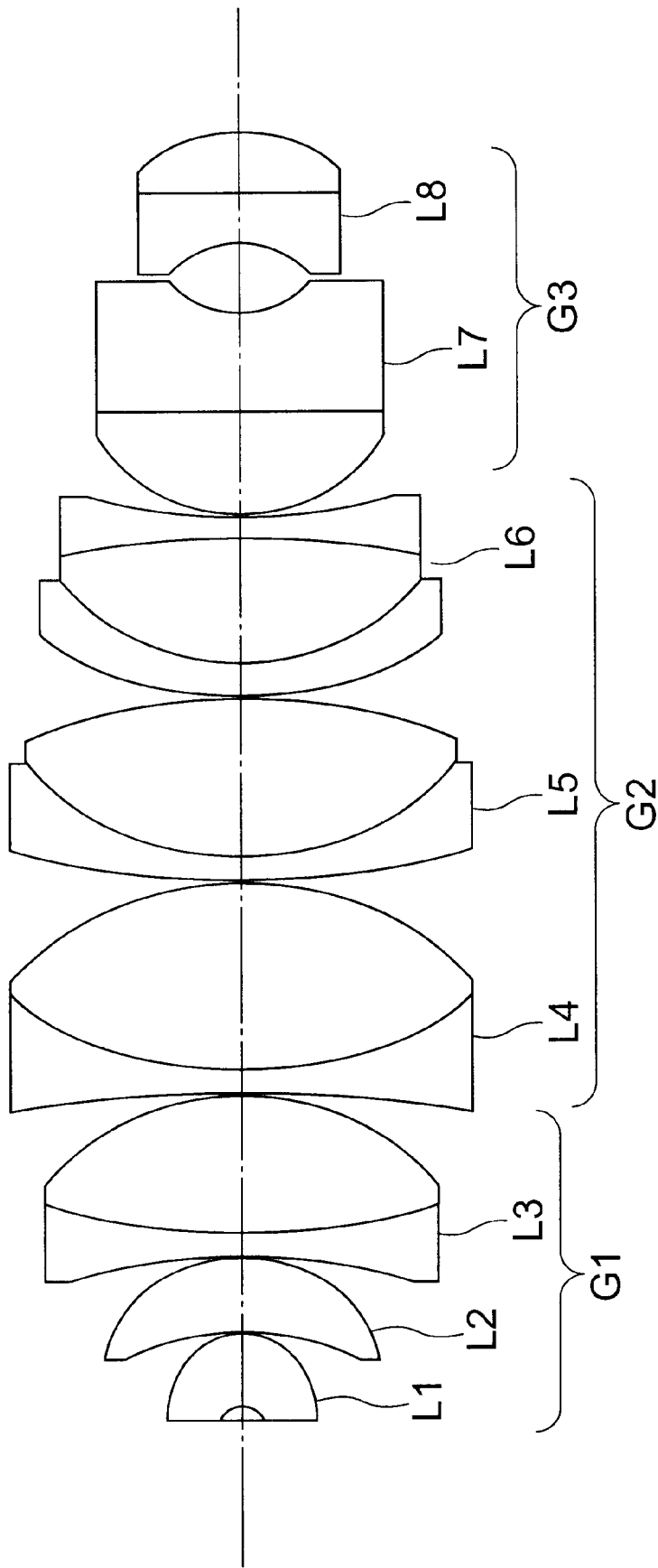
FIG. 1 is a view for schematically showing the structure of an immersion microscope objective lens according to a first embodiment of the present invention.

FIG. 1 is a view for schematically showing the structure of an immersion microscope objective lens according to a first embodiment of the present invention. In the microscope objective lens shown in FIG. 1, a first lens group G1 is composed of a first cemented lens L1 which consists of a plano-convex lens with the flat surface facing the object side and a positive meniscus lens with the convex surface facing the image side cemented together, a positive meniscus lens L2 with the convex surface having a greater refracting power on the image side, and a second cemented lens L3 which consists of a biconcave lens and a biconvex lens cemented together, in the order from the object side.

A second lens group G2 is composed of a third cemented lens L4 which consists of a biconcave lens and a biconvex lens cemented together, a fourth cemented lens L5 which consists of a negative meniscus lens with the convex surface facing the object side and a biconvex lens cemented together, and a fifth cemented lens L6 which consists of a negative meniscus lens with the convex surface facing the object side, a biconvex lens and a biconcave lens cemented together, in the order from the object side.

A third lens group G3 is composed of a sixth cemented lens L7 which consists of a biconvex lens and a biconcave lens cemented together, and a seventh cemented lens L8 which consists of a negative meniscus lens with the concave surface facing the object side and a positive meniscus lens with the convex surface facing the image side cemented together, in the order from the object side.

In the first embodiment, the thickness t of a cover glass is t=0.17 mm, the refractive index nd of the cover glass with respect to the d-line is nd=1.52216, and the Abbe's number vd of the cover glass with respect to the d-line is vd=58.80. In addition, the refractive index nd of the immersion oil with respect to the d-line is nd=1.51536, and the Abbe's number vd of the immersion oil with respect to the d-line is vd=41.36.

The following Table (2) shows specifications of the microscope objective lens according to the first embodiment. In Table (2), F denotes the focal length of the entire objective lens system (the focal length of the objective lens only: mm), NA the numerical aperture of the entire objective lens system, β the magnification of a synthetic optical system in which the objective lens and the imaging lens are combined with each other, and WD an operating distance (the longitudinal or axial distance between the surface of the cover glass on the objective lens side and the lens surface of the objective lens on the most object side: mm), respectively. Further, the surface number indicates the order of each lens surface from the object side, r the radius of curvature (mm) of each lens surface, d the distance (mm) between the lenses, n the refractive index with respect to the d-line ($\lambda$=587.6 nm), and vd the Abbe's number with respect to the d-line, respectively.

TABLE 2

| | F = | 3.33 |
| | NA = | 1.4 |
| | β = | −60.0 |
| | WD = | 0.15 |

| Surface number | r | d | n | vd | |
|---|---|---|---|---|---|
| 1 | ∞ | 0.65 | 1.51823 | 58.90 | (the first lens group G1) |
| 2 | −1.332 | 3.6 | 2.02204 | 29.06 | |
| 3 | −3.716 | 0.1 | | | |
| 4 | −13.716 | 3.75 | 1.56907 | 71.30 | |
| 5 | −7.247 | 0.1 | | | |
| 6 | −27.891 | 1.0 | 1.60342 | 38.03 | |
| 7 | 34.230 | 6.8 | 1.56907 | 71.30 | |
| 8 | −13.453 | 0.15 | | | |
| 9 | −84.754 | 1.0 | 1.61266 | 44.41 | (the second lens group G2) |
| 10 | 20.048 | 9.4 | 1.43385 | 95.25 | |
| 11 | −16.266 | 0.15 | | | |
| 12 | 47.671 | 1.1 | 1.61266 | 44.41 | |
| 13 | 14.802 | 8.0 | 1.43385 | 95.25 | |
| 14 | −28.664 | 0.1 | | | |
| 15 | 18.671 | 1.6 | 1.61266 | 44.41 | |
| 16 | 11.816 | 6.3 | 1.43385 | 95.25 | |
| 17 | −48.478 | 1.0 | 1.52682 | 51.35 | |
| 18 | 25.246 | 0.15 | | | |
| 19 | 8.784 | 5.2 | 1.56907 | 71.30 | (the third lens group G3) |
| 20 | −238.404 | 5.0 | 1.80440 | 39.59 | |
| 21 | 4.823 | 3.4 | | | |
| 22 | 4.801 | 2.6 | 1.80440 | 39.59 | |
| 23 | −204.674 | 3.0 | 1.80518 | 25.46 | |
| 24 | −8.172 | | | | |

(Values for the respective conditions)

(1) n12 = 2.02204
(2) |f31|/F = 7.60
(3) n71 = 1.56907
(4) n82 = 1.80518
(5) n11 = 1.51823

Figure 2:
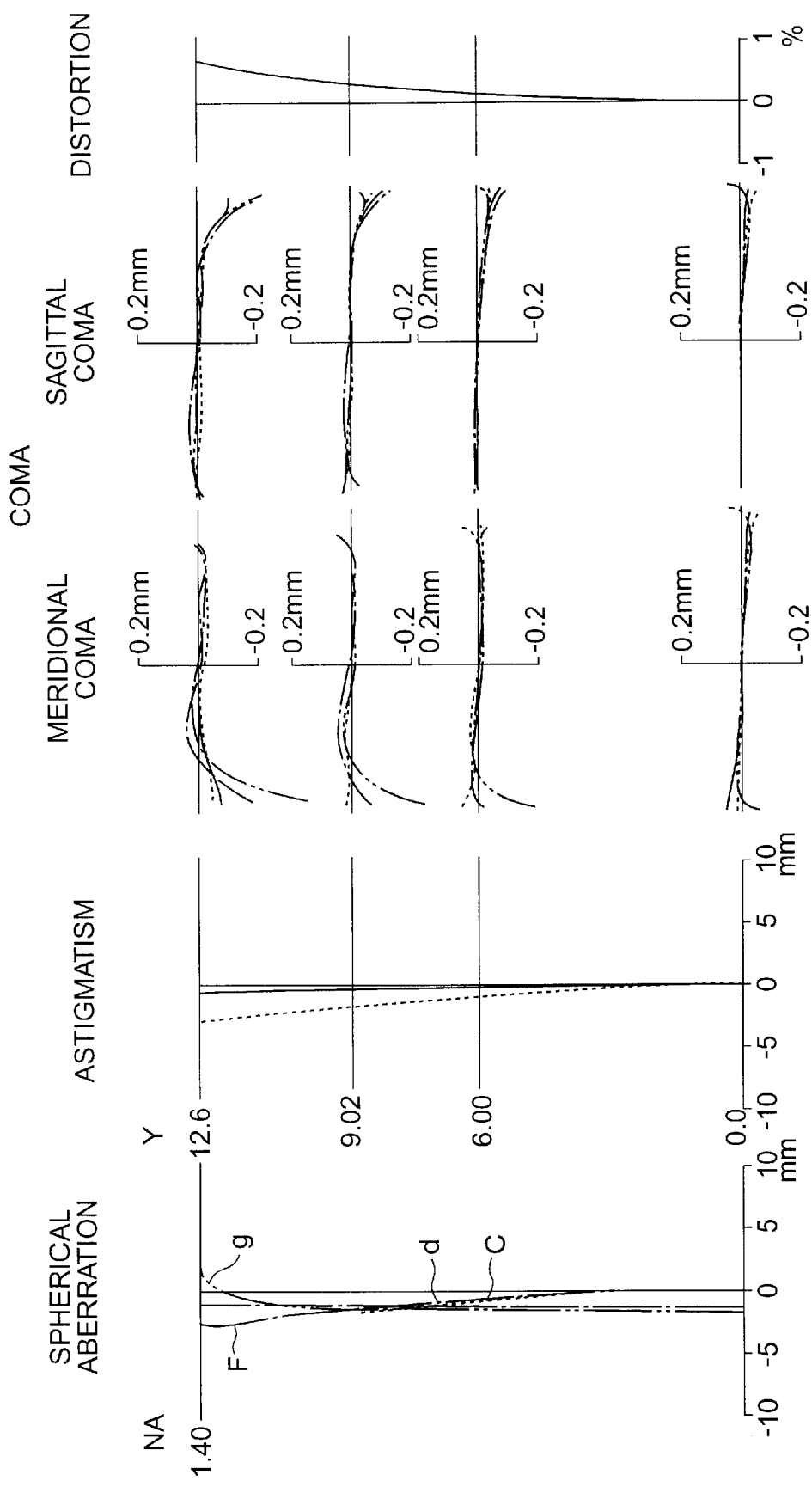
FIG. 2 represents views of aberrations in the first embodiment.

FIG. 2 represents views of aberrations in the first embodiment. In this views, NA denotes the numerical aperture, Y the image height, d the d-line (λ=587.6 nm), C the C-line (λ=656.3 nm), F the F-line (λ=486.1 nm), and g the g-line (λ=435.8 nm), respectively. Moreover, in the views of spherical aberration and coma, a solid line indicate the d-line, a broken line the C-line, a dotted line the F-line, and a double-dotted line the g-line, respectively.

Further, the views of astigmatism and distortion show the aberrations with respect to the d-line serving as a reference wavelength. Moreover, in the view of astigmatism, the solid line indicates a sagittal image field and the broken line indicates a meridional image field, respectively. As clearly seen from these views of aberrations, in the first embodiment, the aberrations including spherical aberration of a color up to the vision field No. 25 are satisfactorily corrected while the high magnification of 60 and the high numerical aperture of 1.4 are maintained, so that an excellent image forming performance can be securely obtained.

[Second Embodiment]

Figure 3:
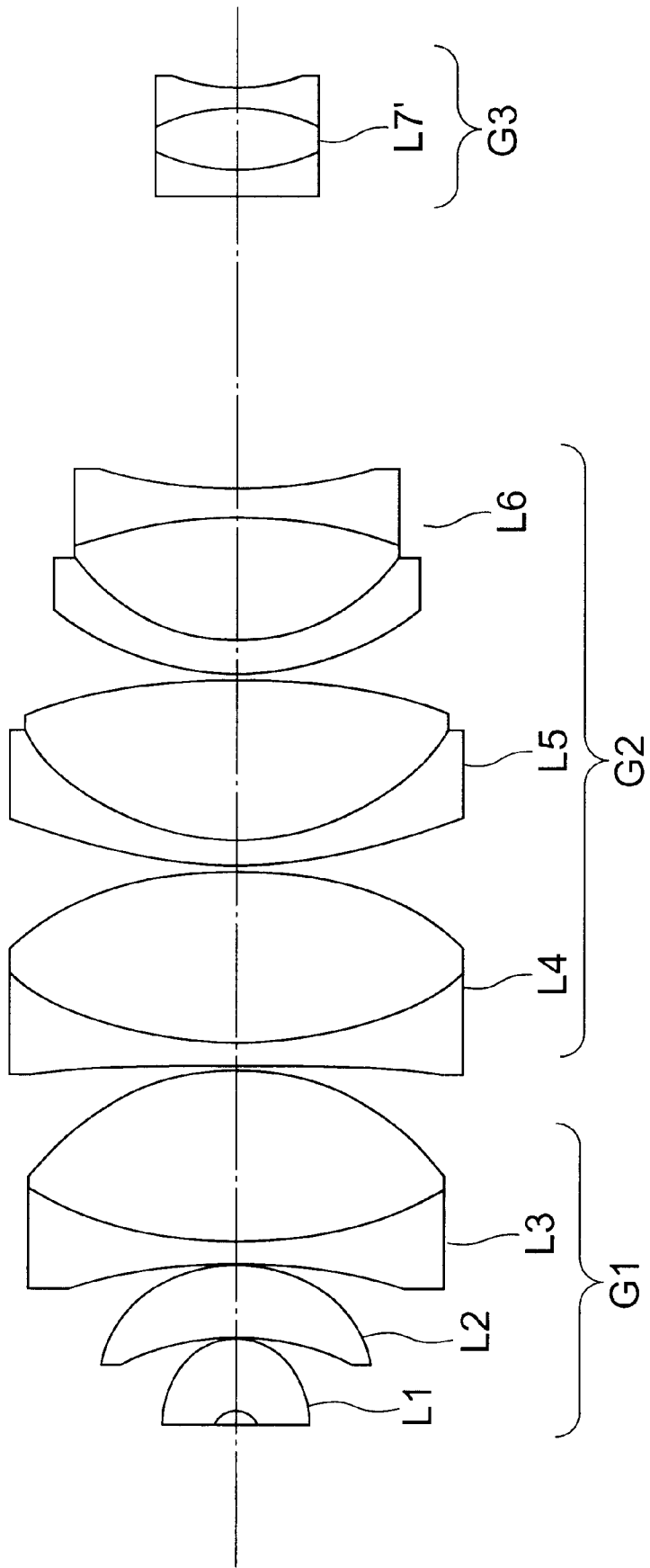
FIG. 3 is a view for schematically showing the structure of an immersion microscope objective lens according to a second embodiment of the present invention.

FIG. 3 is a view for schematically showing the structure of an immersion microscope objective lens according to a second embodiment of the present invention. In the microscope objective lens shown in FIG. 3, a first lens group G1 is composed of a first cemented lens L1 which consists of a plano-convex lens with the flat surface facing the object side and a positive meniscus lens with the convex surface facing the image side cemented together, a positive meniscus lens L2 with the convex surface having a greater refracting power on the image side, and a second cemented lens L3 which consists of a biconcave lens and a biconvex lens cemented together, in the order from the object side.

A second lens group G2 is composed of a third cemented lens L4 which consists of a biconcave lens and a biconvex lens cemented together, a fourth cemented lens L5 which consists of a negative meniscus lens with the convex surface facing the object side and a biconvex lens cemented together, and a fifth cemented lens L6 which consists of a negative meniscus lens with the convex surface facing the object side, a biconvex lens and a biconcave lens cemented together, in the order from the object side. In addition, a third lens group G3 is composed of a cemented lens L7' which consists of a biconcave lens, a biconvex lens and a biconcave lens cemented together, in the order from the object side.

Also, in the second embodiment, like in the first embodiment, the thickness t of a cover glass is t=0.17 mm, the refractive index nd of the cover glass with respect to the d-line is nd=1.52216, and the Abbe's number vd of the cover glass with respect to the d-line is vd=58.80. In addition, the refractive index nd of the immersion oil with respect to the d-line is nd=1.51536, and the Abbe's number vd of the immersion oil with respect to the d-line is vd=41.36.

The following Table (3) shows specifications of the microscope objective lens according to the second embodiment. In Table (3), F denotes the focal length of the entire objective lens system (the focal length of the objective lens only: mm), NA the numerical aperture of the entire objective lens system, β the magnification of a synthetic optical system in which the objective lens and the imaging lens are combined with each other, and WD an operating distance (the longitudinal or axial distance between the surface of the cover glass on the objective lens side and the lens surface of the objective lens on the most object side: mm), respectively. Further, the surface number indicates the order of each lens surface from the object side, r the radius of curvature (mm) of each lens surface, d the distance (mm) between the lens surfaces, n the refractive index with respect to the d-line (λ=587.6 nm), and vd the Abbe's number with respect to the d-line, respectively.

TABLE 3

| | F = | 2.0 |
| | NA = | 1.4 |
| | β = | −100.0 |
| | WD = | 0.15 |

| Surface number | r | d | n | vd | |
|---|---|---|---|---|---|
| 1 | ∞ | 0.6 | 1.51823 | 58.90 | (the first lens group G1) |
| 2 | −1.113 | 3.3 | 2.02240 | 29.06 | |
| 3 | −3.320 | 0.1 | | | |
| 4 | −12.476 | 3.261 | 1.60300 | 65.42 | |
| 5 | −6.818 | 0.15 | | | |
| 6 | −28.872 | 1.0 | 1.52682 | 51.35 | |
| 7 | 20.752 | 7.770 | 1.49782 | 82.52 | |
| 8 | −12.157 | 0.2 | | | |
| 9 | −151.459 | 1.0 | 1.60342 | 38.03 | (the second lens group G2) |
| 10 | 18.680 | 8.227 | 1.43385 | 95.25 | |
| 11 | −16.862 | 0.2 | | | |
| 12 | 25.434 | 1.0 | 1.61266 | 44.41 | |
| 13 | 11.981 | 7.597 | 1.43385 | 95.25 | |
| 14 | −28.918 | 0.2 | | | |
| 15 | 13.722 | 1.5 | 1.74950 | 35.19 | |
| 16 | 9.019 | 5.740 | 1.43385 | 95.25 | |
| 17 | −24.314 | 1.5 | 1.67163 | 38.80 | |

TABLE 3-continued

| 18 | 20.929 | 13.659 | | | |
|---|---|---|---|---|---|
| 19 | −115.034 | 1.0 | 1.77279 | 49.45 | (the third lens group G3) |
| 20 | 7.657 | 3.0 | 1.80518 | 25.46 | |
| 21 | −7.822 | 1.0 | 1.77279 | 49.45 | |
| 22 | 11.351 | | | | |

(Values for the respective conditions)

(1) n12 = 2.02240
(2) |f31|/F = 11.38
(5) n11 = 1.51823

Figure 4:
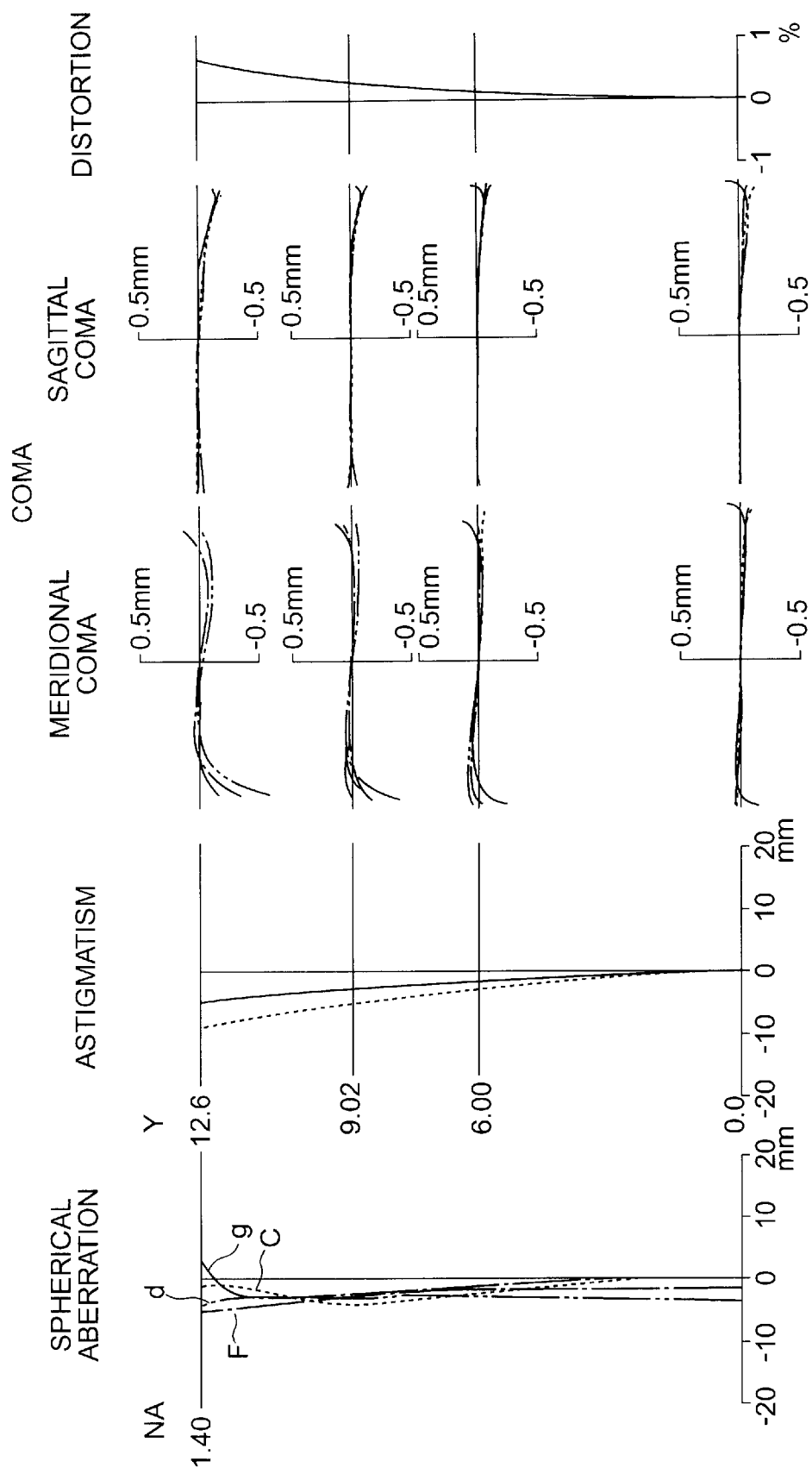
FIG. 4 represents views of aberrations in the second embodiment.

FIG. 4 represents views of aberrations in the second embodiment. In each of these views, NA denotes the numerical aperture, Y the image height, d the d-line (λ=587.6 nm), C the C-line (λ=656.3 nm), F the F-line (λ=486.1 nm), and g the g-line (λ=435.8 nm), respectively. Moreover, in the views of spherical aberration and coma, a solid line indicate the d-line, a broken line the C-line, a dotted line the F-line, and a double-dotted line the g-line, respectively.

Further, the views of astigmatism and distortion show the aberrations with respect to the d-line serving as a reference wavelength. Moreover, in the view of astigmatism, the solid line indicates a sagittal image field and the broken line indicates a meridional image field, respectively. As clearly seen from these views of aberrations, in the second embodiment, the aberrations including a spherical aberration of a color up to the vision field No. 25 are satisfactorily corrected while the high magnification of 100 and the high numerical aperture of 1.4 are maintained, so that an excellent image forming performance can be securely obtained.

[Third Embodiment]

Figure 5:
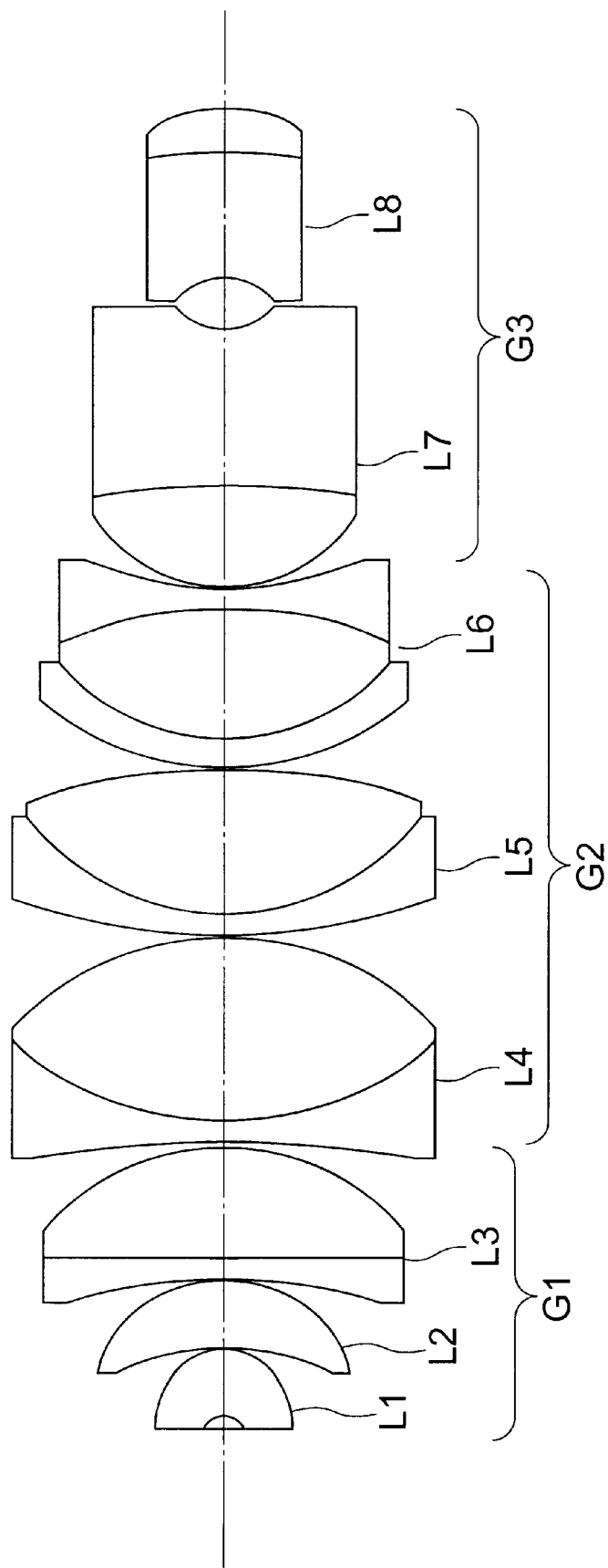
FIG. 5 is a view for schematically showing the structure of an immersion microscope objective lens according to a third embodiment of the present invention.

FIG. 5 is a view for schematically showing the structure of an immersion microscope objective lens according to a third embodiment of the present invention. In the microscope objective lens shown in FIG. 5, a first lens group G1 is composed of a first cemented lens L1 which consists of a plano-convex lens with the flat surface facing the object side and a positive meniscus lens with the convex surface facing the image side cemented together, a positive meniscus lens L2 with the convex surface having a greater refracting power on the image side, and a second cemented lens L3 which consists of a negative meniscus lens with the concave surface facing the object side and a positive meniscus lens with the concave surface facing the object side, in the order from the object side.

A second lens group G2 is composed of a third cemented lens L4 which consists of a biconcave lens and a biconvex lens cemented together, a fourth cemented lens L5 which consists of a negative meniscus lens with the convex surface facing the object side and a biconvex lens cemented together, and a fifth cemented lens L6 which consists of a negative meniscus lens with the convex surface facing the object side, a biconvex lens and a biconcave lens cemented together, in the order from the object side.

A third lens group G3 is composed of a sixth cemented lens L7 which consists of a biconvex lens and a biconcave lens cemented together, and a seventh cemented lens L8 which consists of a negative meniscus lens with the concave surface facing the object side and a positive meniscus lens with the convex surface facing the image side, in the order from the object side.

In the third embodiment, unlike in the first and second embodiments, the thickness t of a cover glass is t=0.17 mm, the refractive index nd of the cover glass with respect to the d-line is nd=1.80411, and the Abbe's number vd of the cover glass with respect to the d-line is vd=46.55. In addition, the refractive index nd of the immersion oil with respect to the d-line is nd=1.80914, and the Abbe's number vd of the immersion oil with respect to the d-line is vd=16.11.

The following Table (4) shows specifications of the microscope objective lens according to the third embodiment. In Table (4), F denotes the focal length of the entire objective lens system (the focal length of the objective lens only: mm), NA the numerical aperture of the entire objective lens system, β the magnification of a synthetic optical system in which the objective lens and the imaging lens are combined with each other, and WD an operating distance (the longitudinal or axial distance between the surface of the cover glass on the objective lens side and the lens surface of the objective lens on the most object side: mm), respectively. Further, the surface number indicates the order of each lens surface from the object side, r the radius of curvature (mm) of each lens surface, d the distance (mm) between the lens surfaces, n the refractive index with respect to the d-line (λ=587.6 nm), and vd the Abbe's number with respect to the d-line, respectively.

TABLE 4

| F = | 2.0 |
|---|---|
| NA = | 1.65 |
| β = | −100.0 |
| WD = | 0.15 |

| Surface number | r | d | n | vd | |
|---|---|---|---|---|---|
| 1 | ∞ | 0.6 | 1.80411 | 46.55 | (the first lens group G1) |
| 2 | −1.113 | 3.206 | 2.02204 | 29.06 | |
| 3 | −3.212 | 0.1 | | | |
| 4 | −13.302 | 3.446 | 1.60300 | 65.42 | |
| 5 | −6.773 | 0.1 | | | |
| 6 | −20.366 | 1.0 | 1.52682 | 51.35 | |
| 7 | −447.839 | 5.256 | 1.49782 | 82.52 | |
| 8 | −11.111 | 0.15 | | | |
| 9 | −65.351 | 1.0 | 1.61266 | 44.41 | (the second lens group G2) |
| 10 | 15.899 | 8.992 | 1.43385 | 95.25 | |
| 11 | −13.670 | 0.15 | | | |
| 12 | 31.346 | 1.1 | 1.61266 | 44.41 | |
| 13 | 12.121 | 6.881 | 1.43385 | 95.25 | |
| 14 | −35.703 | 0.15 | | | |
| 15 | 13.523 | 1.5 | 1.78800 | 47.37 | |
| 16 | 10.443 | 6.3 | 1.43385 | 95.25 | |
| 17 | −19.332 | 1.0 | 1.61266 | 44.41 | |
| 18 | 15.158 | 0.15 | | | |
| 19 | 7.829 | 4.808 | 1.49782 | 82.52 | (the third lens group G3) |
| 20 | −50.000 | 7.864 | 1.52682 | 51.35 | |
| 21 | 3.450 | 2.2 | | | |
| 22 | −2.929 | 6.144 | 1.80440 | 39.59 | |
| 23 | −25.968 | 2.083 | 1.80518 | 25.46 | |
| 24 | −8.031 | | | | |

(Values for the respective conditions)

(1) n12 = 2.02204
(2) |f31|/F = 20.27
(3) n71 = 1.49782
(4) n82 = 1.80518
(5) n11 = 1.80411

Figure 6:
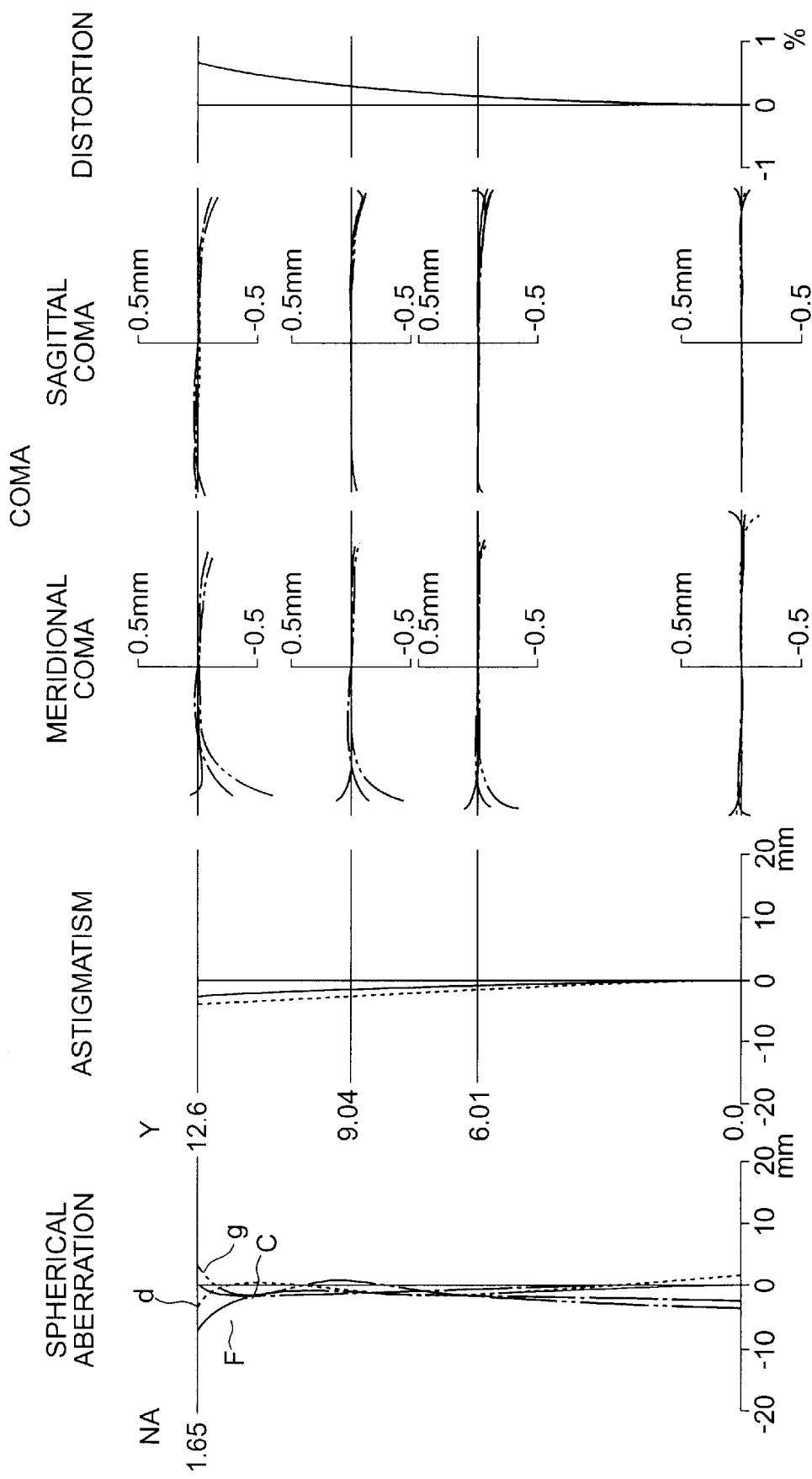
FIG. 6 represents views of aberrations in the third embodiment.

FIG. 6 represents views of aberrations in the third embodiment. In each of these views, NA denotes the numerical aperture, Y the image height, d the d-line (λ=587.6 nm), C the C-line (λ=656.3 nm), F the F-line (λ=486.1 nm), and g the g-line (λ=435.8 nm), respectively. Moreover, in the views of spherical aberration and coma, a solid line indicate the d-line, a broken line the C-line, a dotted line the F-line, and a double-dotted line the g-line, respectively.

Further, the views of astigmatism and distortion show the aberrations with respect to the d-line serving as a reference wavelength. Moreover, in the view of astigmatism, the solid line indicates a sagittal image field and the broken line indicates a meridional image field, respectively. As clearly seen from these views of aberrations, in the third embodiment, the aberrations including a spherical aberration of a color up to the vision field No. 25 are satisfactorily corrected while the high magnification of 100 and the high numerical aperture of 1.65 are maintained, so that an excellent image forming performance can be securely obtained.

As described above, according to the present invention, it is possible to attain an immersion microscope objective lens which has a high magnification of 60 to 100 and a high numerical aperture of 1.4 to 1.65 with an excellent image forming performance, in which aberrations (including a spherical aberration, a chromatic aberration, a coma and a curvature of field) are satisfactorily corrected over a wide vision field up to the vision field number of 25.

What is claimed is:

1. An immersion microscope objective lens comprising, in order from an object side, a first lens group G1 having a positive refracting power, a second lens group G2 having a positive refracting power and a third lens group G3 having a negative refracting power, wherein:

the first lens group G1 has a first cemented lens component comprising, in order from the object side, a plano-convex lens with a flat surface facing the object side and a meniscus lens with a convex surface facing an image side, a positive lens with a surface having a greater refractive power facing the image side, and a second cemented lens component comprising a negative lens and a positive lens;

the second lens group G2 has a cemented lens component comprising a negative lens and a positive lens; and a refractive index n12 of the meniscus lens in the first lens group G1 with respect to a d-line satisfies the following condition:

$n12>2.0.$

2. An immersion microscope objective lens as claimed in claim 1, wherein the second lens group G2 comprises two cemented lens components, each of the two cemented lens components comprising a negative lens and a positive lens.

3. An immersion microscope objective lens according to claim 1, wherein:

the third lens group G3 has a third cemented lens component comprising a positive lens with a convex surface facing the object side and a negative lens with the concave surface facing the image side, and a fourth cemented lens component comprising, in order from the object side, a negative lens with a concave surface facing the object side and a positive lens with a convex surface facing the image side; and the objective lens satisfies the following conditions:

$n71>1.49;$ and $n82>1.6,$ where n71 is the refractive index of the positive lens in the third cemented lens component with respect to the d-line and n82 is the refractive index of the positive lens in the fourth cemented lens component with respect to the d-line.

4. An immersion microscope objective lens comprising, in order from an object side, a first lens group G1 having a positive refracting power, a second lens group G2 having a positive refracting power and a third lens group G3 having a negative refracting power, wherein:

the first lens group G1 has a first cemented lens component comprising, in order from the object side, a plano-convex lens with a flat surface facing the object side and a meniscus lens with a convex surface facing an image side, a positive lens with a surface having a greater refractive power facing the image side, and a second cemented lens component comprising a negative lens and a positive lens;

the second lens group G2 has two cemented lens components, each of the two cemented lens components comprising a negative lens and a positive lens; and a refractive index n12 of the meniscus lens in the first lens group G1 with respect to a d-line satisfies the following condition:

$n12>2.0.$

5. An immersion microscope objective lens as claimed in claim 4, wherein the second lens group G2 further comprises a cemented lens component with a negative meniscus lens, a biconvex lens, and a biconcave lens.

6. An immersion microscope objective lens according to claim 4, wherein:

the third lens group G3 has a third cemented lens component comprising a positive lens with a convex surface facing the object side and a negative lens with the concave surface facing the image side, and a fourth cemented lens component comprising, in order from the object side, a negative lens with a concave surface facing the object side and a positive lens with a convex surface facing the image side; and the objective lens satisfies the following conditions:

$n71>1.49;$ and $n82>1.6,$ where n71 is the refractive index of the positive lens in the third cemented lens component with respect to the d-line and n82 is the refractive index of the positive lens in the fourth cemented lens component with respect to the d-line.

7. An immersion microscope objective lens comprising a first lens group G1 having a positive refracting power, a second lens group G2 having a positive refracting power and a third lens group G3 having a negative refracting power in the order from the object side, wherein:

the first lens group G1 has a first cemented lens comprising a plano-convex lens with the flat surface facing the object side and a meniscus lens with the convex lens facing the image side cemented together, a positive lens with the surface having a greater refractive power facing the image side, and a second cemented lens comprising a negative lens and a positive lens cemented together, in the order from the object side;

the second lens group G2 has a third cemented lens comprising a negative lens and a positive lens cemented together, a fourth cemented lens comprising a negative lens and a positive lens cemented together, and a fifth cemented lens comprising a negative meniscus lens, a biconvex lens, and a biconcave lens cemented together, in the order from the object side; and the refractive index n12 of the meniscus lens in the first lens group G1 with respect to the d-line satisfies the following condition:

n12>1.9.

8. An immersion microscope objective lens comprising a first lens group G1 having a positive refracting power, a second lens group G2 having a positive refracting power and a third lens group G3 having a negative refracting power in the order from the object side, wherein:

the first lens group G1 has a first cemented lens comprising a plano-convex lens with the flat surface facing the object side and a meniscus lens with the convex lens facing the image side cemented together, a positive lens with the surface having a greater refractive power facing the image side, and a second cemented lens comprising a negative lens and a positive lens cemented together, in the order from the object side;

the second lens group G2 has a third cemented lens comprising a negative lens and a positive lens cemented together, a fourth cemented lens comprising a negative lens and a positive lens cemented together, and a fifth cemented lens comprising a negative meniscus lens, a biconvex lens, and a biconcave lens cemented together, in the order from the object side; and the refractive index n12 of the meniscus lens in the first lens group G1 with respect to the d-line satisfies the condition n12>1.9, wherein the following condition is satisfied:

5<|f31|/F<25, where the focal length of the negative lens for constituting the second cemented lens in the first lens group G1 is f31, and the focal length of the entire objective lens system is F.

9. An immersion microscope objective lens comprising a first lens group G1 having a positive refracting power, a second lens group G2 having a positive refracting power and a third lens group G3 having a negative refracting power in the order from the object side, wherein:

the first lens group G1 has a first cemented lens comprising a plano-convex lens with the flat surface facing the object side and a meniscus lens with the convex lens facing the image side cemented together, a positive lens with the surface having a greater refractive power facing the image side, and a second cemented lens comprising a negative lens and a positive lens cemented together, in the order from the object side;

the second lens group G2 has a cemented lens comprising a negative lens and a positive lens cemented together; and the refractive index n12 of the meniscus lens in the first lens group G1 with respect to the d-line satisfies the condition n12>1.9, wherein the refractive index n11 of the plano-convex lens in the first lens group G1 with respect to the d-line satisfies the condition n11>1.55.

10. An immersion microscope objective lens comprising a first lens group G1 having a positive refracting power, a second lens group G2 having a positive refracting power and a third lens group G3 having a negative refracting power in the order from the object side, wherein:

the first lens group G1 has a first cemented lens comprising a plano-convex lens with the flat surface facing the object side and a meniscus lens with the convex lens facing the image side cemented together, a positive lens with the surface having a greater refractive power facing the image side, and a second cemented lens comprising a negative lens and a positive lens cemented together, in the order from the object side;

the second lens group G2 has a cemented lens comprising a negative lens and a positive lens cemented together; and the refractive index n12 of the meniscus lens in the first lens group G1 with respect to the d-line satisfies the condition n12>1.9, wherein the following condition is satisfied:

5<|f31|/F<25, where the focal length of the negative lens for constituting the second cemented lens in the first lens group G1 is f31, and the focal length of the entire objective lens system is F, and wherein the refractive index n11 of the plano-convex lens in the first lens group G1 with respect to the d-line satisfies the condition n11>1.55.

* * * * *